Nov. 21, 1939. R. F. BACON 2,180,495
RECOVERY OF SULPHUR DIOXIDE
Filed May 18, 1938 2 Sheets-Sheet 1
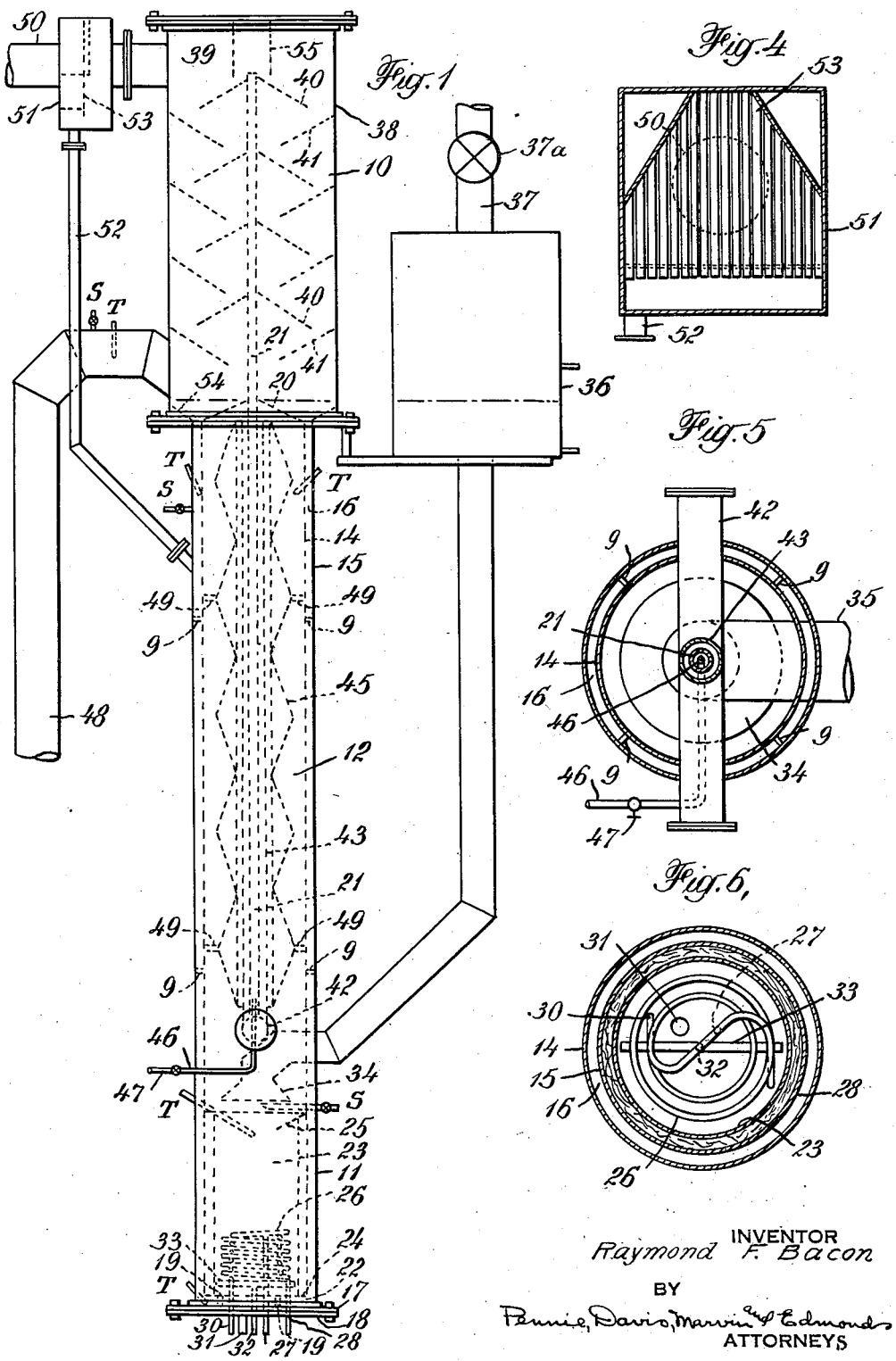
INVENTOR
Raymond F. Bacon
BY
Pennie, Davis, Marvin & Edmonds
ATTORNEYS Nov. 21, 1939.    R. F. BACON    2,180,495
RECOVERY OF SULPHUR DIOXIDE
Filed May 18, 1938    2 Sheets-Sheet 2
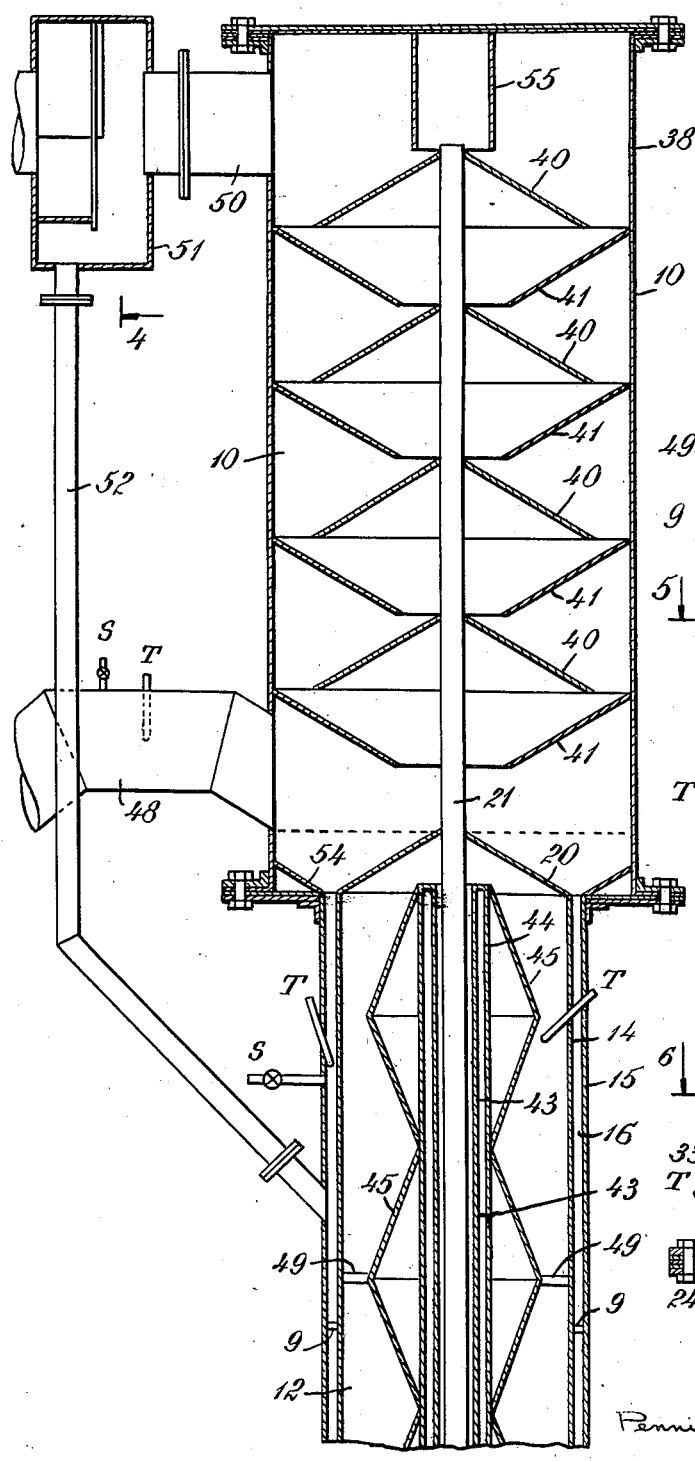
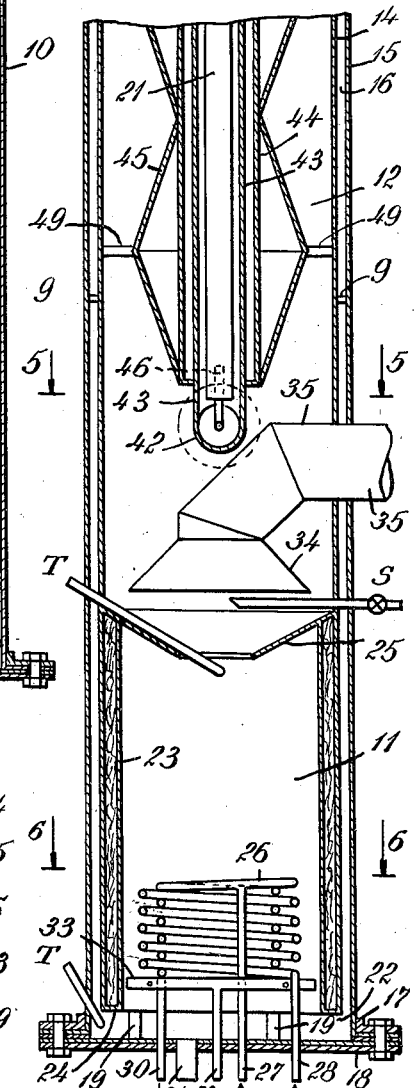
INVENTOR
Raymond F. Bacon
BY
Pennie, Davis, Marvin & Edmonds
ATTORNEYS Patented Nov. 21, 1939

2,180,495

UNITED STATES PATENT OFFICE 2,180,495

RECOVERY OF SULPHUR DIOXIDE

Raymond F. Bacon, Bronxville, N. Y.

Application May 18, 1938, Serial No. 208,551

9 Claims. (Cl. 261—111)

This invention relates to the recovery of sulphur dioxide and has for an object the provision of an improved method and improved apparatus for recovering sulphur dioxide by absorption from mixtures of gases containing sulphur dioxide. More particularly, the invention contemplates the provision of an improved method and improved apparatus for employing liquid absorption media in the absorption treatment of gases containing sulphur dioxide. A further object of the invention is to provide an improved method and improved apparatus by means of which liquid absorption media containing solids in suspension may be employed advantageously.

In processes for recovering sulphur dioxide from mixtures of gases containing the same, it is customary to subject the gases to the action of a liquid absorption medium in a suitable absorption chamber, as, for example, by passing the gases and the absorption medium through the chamber in counter-current flow. The pregnant absorption medium, containing the absorbed sulphur dioxide, is withdrawn from the absorption chamber and passed to a stripping chamber in which the absorbed sulphur dioxide is liberated, and the resulting stripped or impoverished absorption medium is returned from the stripping chamber to the absorption chamber for re-use, the liberated sulphur dioxide being collected and further treated, if necessary, to adapt it for commercial use. When heat is employed for liberating the absorbed sulphur dioxide, heat exchanging means usually are provided for transferring heat from the stripped absorption medium to the pregnant absorption medium passing from the absorption chamber to the stripping chamber.

The methods and apparatus employed heretofore are quite satisfactory when the liquid absorption media employed are free of suspended solids, but, when the liquid absorption media contain suspended solids, for example, in the form of suspended absorption agents or in the form of compounds precipitated from solution as a result of the absorption operation or the stripping operation, considerable difficulty results from clogging or choking or from wearing out of the pumps or other portions of the apparatus because of abrasion. The arrangement of apparatus employed heretofore has been such, also, that heat exchanging operations have not been highly satisfactory.

By means of the present invention, it is possible to avoid the difficulties encountered heretofore. In accordance with the invention, the absorption chamber and the stripping chamber are so arranged relatively to one another that absorption medium may flow from the absorption chamber to the stripping chamber by gravity and at such a rate as to inhibit or prevent the settling of solids suspended therein. The interior surfaces of the various parts of the apparatus are smooth and disposed at angles such that solids tending to separate from the absorption medium are prevented from accumulating thereon.

Preferably, the absorption chamber is disposed above the stripping chamber, and the conduit through which stripped absorption medium is returned from the stripping chamber to the absorption chamber is disposed within the conduit through which the pregnant absorption medium flows from the absorption chamber to the stripping chamber. Such an arrangement provides for efficient heat exchange and economical operation. The preferred form of apparatus of the invention comprises a substantially vertical tower comprising three main elements or sections, namely, an absorption section adjacent the top of the tower, a liberating or stripping section adjacent the bottom of the tower and a heat exchange section disposed mainly between the absorption section and the liberating or stripping section but having its lower portion surrounding the walls of the stripping or liberating section.

The invention provides an air-lift device for returning absorption medium from the stripping chamber to the absorption chamber. The air-lift device preferably is operated by means of a portion of the gas to be treated by absorption. Such a procedure permits an increase in the efficiency of the absorption operation by combining sulphur dioxide with liquid transfer. In the preferred apparatus of the invention, the air-lift device is disposed substantially centrally of the vertical tower.

The stripping chamber of the invention includes an open steam coil which functions to heat the absorption medium for stripping and to provide make-up liquid to compensate for evaporation losses. This is particularly advantageous when aqueous absorption media are employed and evaporation losses consequently are high.

One of the particular advantages of the invention resides in the fact that it permits the use of relatively highly concentrated solutions or suspensions of absorption agents with high absorption capacities. An absorption medium of the type which may be employed advantageously in the apparatus of the invention, for example, is a concentrated aqueous solution of a relatively highly soluble salt of a relatively slightly soluble weak acid. In the absorption operation, the acid of the salt is regenerated and thrown out of solution in the form of a finely divided solid. A process employing such an absorption medium (with excess free weak acid), invented by me and Rocco Fanelli, is described and claimed in application Serial Number 186,014, filed January 21, 1938, which application also describes and illustrates the apparatus of the present invention.

This invention will be better understood from a consideration of the following description in conjunction with the accompanying drawings, in which Fig. 1 is an elevation of a combined absorption, liberation and heat exchanging tower of the invention;

Fig. 2 is a sectional elevation of the upper portion of the apparatus shown in Fig. 1;

Fig. 3 is a sectional elevation of the lower portion of the apparatus shown in Fig. 1;

Fig. 4 is a sectional elevation of a moisture trap for removing entrained liquid from gases leaving the apparatus;

Fig. 5 is a section taken substantially along the line 5—5 of Fig. 3; and

Fig. 6 is a section taken substantially along the line 6—6 of Fig. 3.

The apparatus shown in the drawings includes a substantially vertical tower comprising three main elements or sections, namely, an absorption section 10 adjacent the top, a liberating or stripping section 11 adjacent the bottom and a heat exchange section 12 disposed mainly between the absorption section 10 and the liberating or stripping section 11 but having its lower portion surrounding the outer walls of the stripping or liberating section.

The heat exchange section comprises an inner vertically disposed cylinder 14 and an outer cylinder 15 surrounding the inner cylinder and disposed in axial alignment therewith with its inner wall spaced from the outer wall of the inner cylinder to form an annular passage 16 for the flow of liquid therethrough. The outer cylinder 15 is provided at its lower end with a flange 17 which is bolted to a closure plate 18 with a suitable gasket disposed between the flange and the closure plate to provide a fluid tight joint. The inner cylinder is supported adjacent its upper end by means of a substantially frusto-conical closure member 20 rigidly attached to its peripheral edge and to an airlift conduit or pipe 21 (to be described hereinafter) which extends vertically in axial alignment with the inner cylinder 14 and with the frusto-conical closure member 20 to form fluid tight joints. The lower end of the inner cylinder 14 is spaced above the bottom closure plate 18 to provide a fluid passage 22 therebetween communicating with the annular passage 16 between the inner cylinder 14 and the outer cylinder 15 and with the interior of the liberating or stripping section 11. Additional means in the form of spaced brackets 9 extending between and attached to the inner walls of the inner and outer cylinders 14 and 15 by spot welding and spaced supporting elements 19 disposed between the lower end of the inner cylinder and the bottom closure plate 18 are provided for aiding in supporting the inner cylinder.

The liberating or stripping section or chamber 11 is disposed in the lower end portion of the inner cylinder 14, its outer wall being formed by the lower portion of the inner cylinder, and its inner wall being formed by a relatively short cylinder 23 extending vertically in axial alignment with the inner cylinder 14 with its outer cylindrical surfaces spaced from the inner surface of the inner cylinder. The space between the inner cylinder 14 and the stripping chamber cylinder 23 is filled with a suitable heat insulating material such as infusorial earth or slag wool. Its lower end is closed by means of an annular plate 24 and its upper end by the outer peripheral edge portion of an inverted frusto-conical closure member 25 having a central opening therein providing a passage for the flow of liquid between the interior stripping chamber and the interior of the heat exchange section of the apparatus. Both closure members form fluid tight joints between the inner cylinder 14 and the stripping chamber cylinder 23.

A closed heating coil 26 is mounted within the stripping chamber 11 adjacent the bottom thereof. Steam conduits 27 and 28 extending through the bottom closure plate 18 are provided for introducing steam under pressure from a suitable source (not shown) into the heating coil element 26. A conduit 30 extending through the closure plate 18 provides an outlet for the steam heating element 26. A relatively large conduit 31 communicating with the interior of the stripping chamber 11 through the closure plate 18 provides means for introducing liquid into the apparatus and for draining the apparatus. A steam conduit 32 extends through the closure plate 18 into the interior of the stripping chamber and communicates below the heating element 26 with a transversely extending header 33 closed at its ends, but having two or more upwardly opening passages adjacent its ends directly below the inner and outer portions of the coils of the heating element 26. The conduit 32 and header 33 provides means for introducing live steam into the absorption solution to aid in liberating sulphur dioxide and to provide a portion, at least, of the make-up water required to compensate for evaporation when an aqueous medium is employed for absorption. This open heating unit aids to some extent in preventing solids suspended in liquid within the apparatus from settling on the coils.

A downwardly opening hood 34 is mounted above the central opening in the inverted frusto-conical upper closure member 25 of the stripping chamber. The hood communicates with a relatively large conduit 35 which extends upwardly, exteriorly of the outer cylinder 15, to a point slightly below the top of the heat exchange section 12 where it joins and communicates with the interior of a gas separating chamber 36. The chamber 36 extends upwardly to a point above the lower portion of the absorption section 10. A gas conduit 37 having a control valve 37a therein communicates with the interior of the separating chamber 36 at the top and with suitable gas collection apparatus (not shown).

The absorption section 10 comprises an outer cylinder 38 having a flanged lower end bolted to a flange mounted on the upper end portion of the outer cylinder 15 of the heat exchange section with a suitable gasket disposed between the flanges to provide a fluid tight joint.

The cylinder 38 is flanged at the top and closed by means of a plate 39 bolted to the flange with a suitable gasket between the flange and plate to provide a fluid tight joint.

The tower, comprising the absorption, heat exchange and stripping sections, is mounted on and maintained in vertical position by suitable supporting means (not shown).

The absorption section 10 comprises a series of alternately erect and inverted frusto-conical baffle members 40 and 41, respectively, suitably spaced apart, provided with central openings and supported within the cylinder 38. The baffle members 40 and 41 may be provided with water cooling means (not shown). The baffles 40 are smaller in diameter than the inner diameter of the cylinder 38, and they are supported by the air-lift conduit 21 by attachment of the peripheral edges of their central openings thereto. The baffles 41 are of the same diameter as the inner diameter of the cylinder 38, and they are attached at their peripheral edges to the wall of the cylinder 38. The lower peripheral portion of the cylinder 38 is blocked off by an inverted frusto-conical filler member 54 which provides a smooth upper surface inclined downwardly toward the annular heat exchanger passage 16. A cylindrical member 55 disposed in axial alignment with the air-lift conduit 21 functions to restrict the spraying of liquid issuing from that conduit and to direct the liquid to the central portion of the upper baffle 40.

The air-lift conduit 21 extends from a point adjacent to but spaced from the top of the cylinder 38 to a point adjacent the hood 34 where it communicates with the interior of a conduit 42, which forms an air lift well or sump, extending transversely through the heat exchange section and closed at its outer ends. The air lift conduit 21 extends axially through a cylindrical casing 43, with its walls spaced from the walls of the casing, which casing extends from a point near but spaced from the top of the heat exchange section to the sump 42 with which it communicates through a fluid tight joint. The space between the air-lift conduit 21 and the surrounding casing 43 forms an annular passage open at the top and communicating at the bottom with the interior of the sump 42.

The casing 43 is surrounded by a cylindrical conduit 44 with its walls spaced therefrom and with its ends joined to the ends of the cylindrical conduit to form a sealed space for heat insulating purposes. The space between the casing 43 and the conduit 44 may be filled with a heat insulating material such, for example, as cellite, or means (not shown) may be provided for circulating a cooling fluid such as water therethrough. A series of baffles 45 in the form of connected alternately erect and inverted frusto-conical elements formed of sheet material and open at their ends are mounted on and surround the cylindrical conduit 44. The baffles 45 are attached to the conduit 44 adjacent the peripheral edges of their reduced portions to form fluid tight seals, thus providing additional heat insulation for the casing 43. These baffles provide a tortuous path of travel for liquid flowing upwardly within the inner cylinder 14 of the heat exchange section of the apparatus. The baffles serve to cause desirably thorough contact of such liquid with the inner surface of the inner cylinder 14. The assembly comprising the baffles 45, the casing 43 and the conduit 44 is supported in position by means of brackets 49 extending between the baffles 45 and the inner cylinder 14, the brackets 49 being employed in number and size sufficient to afford suitable support for the assembly without obstructing the passage between the assembly and the inner cylinder.

A pipe 46 of small diameter connected with a supply of gas under pressure (not shown) extends through the sump 42 from the exterior of the apparatus and projects upwardly a short distance into the air-lift conduit 21, the joints formed at the points where the conduit 46 passes through walls of the apparatus being made fluid tight. A suitable valve 47 is provided for controlling the flow of gas through the conduit 46. The source of gas to which the conduit 46 is connected may consist of gas containing sulphur dioxide from the same source as that of the gas undergoing treatment in the process for the recovery of its sulphur dioxide content.

A conduit 48 is provided for introducing gases containing sulphur dioxide into the lower portion of the absorption section. A conduit 50 having a trap 51 disposed therein is provided for conducting gases from the absorption section. A conduit 52 communicates with the bottom of the trap 51 and with the annular space 16 of the heat exchange section to return to the system liquid separated from the exit gases. The trap 51 comprises a chamber provided with a series of baffles 53 disposed in the path of travel of gases therethrough to remove from the gases liquid particles suspended therein by reduction of velocity through change of direction.

Thermometer or pyrometer wells, indicated by the letter T, and conduits and valves to permit sampling, indicated by the letter S, are disposed at suitable points in the apparatus to aid in controlling the operation of the apparatus.

It is to be understood that the apparatus is provided with all valves and other control elements necessary for its successful operation and that all joints are fluid tight where necessary. Gaskets employed may be formed of rubber, and valves may be formed of hard rubber or other suitable corrosion resistant material. All structural elements of the apparatus which contact the absorption solution or mixture are formed of a suitable corrosion resistant material such as 18-8 stainless steel. The nature of the apparatus is such that relatively thin and light sheet steel may be used in its construction. All inner surfaces are smooth and the surfaces above the base are disposed either vertically or at relatively large angles to the horizontal to prevent local accumulations of solids which may be suspended in the absorption medium.

Operation of the apparatus will be described hereinafter with particular reference to the use of a water solution of borax and boric acid for absorption of sulphur dioxide, as described in the aforementioned application.

In the operation of the apparatus, a solution of borax and boric acid in water, preferably saturated with respect to both compounds at its boiling temperature, is introduced at its boiling temperature through the bottom inlet 31 in an amount sufficient to fill the apparatus to a depth slightly greater than that indicated by the liquid level lines shown in the lower portions of the absorber section 10 and the gas separating chamber 36. The amount or volume of solution introduced should be sufficient to maintain a depth substantially equal to that indicated by the liquid level lines when the apparatus is in operation. When the desired amount of solution has been introduced, solution will be present in the air-lift sump 42 and conduit 21, in the annular passage surrounding the air-lift conduit 21, in the space between the baffles 45 and the inner cylinder 14, in the annular passage between the inner cylinder 14 and the outer cylinder 15, and in the conduit 35 and gas separating chamber 36.

The temperature of the solution remaining in the liberation or stripping section 11 after the desired amount of solution has been introduced is maintained by introducing steam under proper pressure into the heating coil, steam being introduced into the liquid through the header 33 only when such introduction will not cause undesirable dilution of the solution. Some steam can be introduced into the solution through the header 33 constantly during the operation of the apparatus, the rate of introduction being determined by the rate of loss of water from the solution by evaporation and otherwise.

Before starting the operation of the apparatus, the solution in the upper portion of the apparatus may be permitted to cool to a desirable absorption temperature, say to a temperature of about 50° C., or operation may be started immediately and temperature conditions allowed to adjust themselves during controlled operation.

Operation of the apparatus is started by introducing gas under pressure, preferably a portion of the sulphur dioxide-bearing gas to be treated, into the air-lift conduit 21 through the small conduit or injector tube 46 extending into the air-lift conduit 21. When the gas under pressure is thus introduced, solution flows upwardly to the top of the absorption section 10 and downwardly therefrom to the lower portion of the absorption section, over the baffles 40 and 41 and into the annular passage 16 between the inner and outer cylinders 14 and 15 of the heat exchanger section. When flow of solution through the absorber section has been established, gas to be treated for the recovery of sulphur dioxide contained therein is introduced into the lower portion of the absorber section through the gas inlet conduit 48, the gas thus introduced passing upwardly through the absorber counter-currently to the flow of solution.

The solution follows a tortuous path over the baffles 40 and 41 in the form of thin films of very large area. The ascending gases follow a similar path in reverse direction and in a state of great turbulence which results in thorough and intimate contact of the gases and solution.

The sulphur dioxide contained in the gases is absorbed by the solution, and the residual gases pass to waste through the exit conduit 50 and the baffle chamber 51.

Precipitation of boric acid which may result from the absorption reactions does not interfere with the flow of gas and solution or with the operation of the apparatus in other respects. The precipitated material will exist in the form of very finely divided particles having a tendency to remain in suspension, and the inner surfaces above the base with which solution which might contain suspended matter comes into contact are disposed at such angles that the degree of quiescence required to permit settling out can not be established.

Pregnant solution containing the absorbed sulphur dioxide flows downwardly from the lower portion of the absorber through the annular passage 16 and through the passage 22 into the lower portion of the liberating or stripping section 11. The pregnant solution is heated to its boiling point in the liberator or stripper by introducing steam at a suitable temperature into the heating coil 26 and header 33. The sulphur dioxide contained in the pregnant solution is stripped or liberated rapidly from the solution and passes upwardly through the stripper to the hood 34 and through the column of saturated solution in the conduit 35 to the gas separator 36. Sulphur dioxide from the gas separator flows through the outlet conduit 37 to suitable collection apparatus where it may be dried and otherwise treated to form a product suitable for use.

As stripping proceeds, solid boric acid which enters the stripper in suspension in the pregnant solution dissolves with regeneration of the borate. The solution in the stripper remains saturated with boric acid as it was when introduced into the apparatus originally.

The stripped solution passes upwardly through the central opening in the closure member 25 and to the top of the heat exchanger section where it enters the annular passage surrounding the air-lift conduit 21 and flows to the air-lift sump 42 in condition and position to be recirculated through the apparatus.

In passing upwardly through the heat exchanger section, the stripped solution passes in heat exchange relationship with the relatively cool pregnant solution flowing downwardly through the annular passage 16, heat being transferred readily through the thin steel wall of the inner cylinder 14. Thus, the hot stripped solution functions to heat the relatively cool pregnant solution to a temperature approaching the suitable stripping temperature, and the relatively cool pregnant solution functions to extract heat from the stripped solution and cool it to a temperature suitable for absorption. It is advisable to so control temperatures and rates of flow that the temperature of the pregnant solution remains below 85° C. until it passes into the stripper.

Temperature control will be aided by using fluid cooled baffles in the absorber, by passing or circulating a cooling fluid through the closed annular insulating space surrounding the air-lift conduit 21 and by regulating the heat passing to the atmosphere from the absorber and the heat exchanger through the use of heating means or heat dissipating means.

As the stripped solution is cooled in passing upwardly through the heat exchanger, boric acid precipitates from the solution. The precipitated boric acid is in the form of finely divided particles which tend to remain in suspension and travel through the heat exchanger and through the air-lift apparatus to the absorber with the true solution. Any tendency of these particles to separate and settle out is counter-acted by the dissolving action of the hot solution in the stripper. In operation, conditions within the apparatus adjust themselves to establish and maintain suitable equilibria between liquids and solids in the various parts of the apparatus.

I claim:

1. Apparatus for use in the absorption treatment of a gas containing sulphur dioxide with a liquid absorption medium of such character that a finely divided solid becomes precipitated therein during the cycle of absorption and release of sulphur dioxide, comprising an absorption chamber, a stripping chamber disposed at an elevation lower than the elevation of the absorption chamber, means for introducing a liquid absorption medium into the absorption chamber, means for contacting the gas to be treated by absorption with liquid absorption medium within the absorption chamber, conduit means connecting the interior of the absorption chamber with the interior of the stripping chamber permitting the flow of absorption medium from the absorption chamber to the stripping chamber by gravity, said conduit means being sufficiently steeply inclined and free of obstructions to enable gravity flow of the absorption medium with finely divided solids dispersed therein without local accumulation of such solids in said conduit, whereby said conduit means may accommodate flow of absorption medium therethrough without clogging due to accumulation of solids, means for stripping or liberating absorbed sulphur dioxide from absorption medium within the stripping chamber, means for collecting sulphur dioxide liberated in the stripping chamber, and means for returning absorption medium after liberation of absorbed sulphur dioxide from the stripping chamber to the absorption chamber, said returning means being sufficiently free of constrictions and pockets to enable return of the absorption medium with finely divided solids therein without local accumulation of said solids in said returning means, whereby said absorption medium may be returned to said absorption chamber without clogging of the returning means by accumulation of solids therein.

2. Apparatus for use in the absorption treatment of a gas containing sulphur dioxide with a liquid absorption medium of such character that a finely divided solid becomes precipitated therein during the cycle of absorption and release of sulphur dioxide, comprising an absorption chamber, a stripping chamber disposed at an elevation lower than the elevation of the absorption chamber, means for introducing a liquid absorption medium into the absorption chamber, means for contacting the gas to be treated by absorption with liquid absorption medium within the absorption chamber, conduit means connecting the interior of the absorption chamber with the interior of the stripping chamber permitting the flow of absorption medium from the absorption chamber to the stripping chamber by gravity, said conduit means being sufficiently steeply inclined and free of obstructions to enable gravity flow of the absorption medium with finely divided solids dispersed therein without local accumulation of such solids in said conduit, whereby said conduit means may accommodate flow of absorption medium therethrough without clogging due to accumulation of solids, means for stripping or liberating absorbed sulphur dioxide from absorption medium within the stripping chamber, means for collecting sulphur dioxide liberated in the stripping chamber, and means including an air-lift device for returning absorption medium after liberation of absorbed sulphur dioxide from the stripping chamber to the absorption chamber, said air-lift device being sufficiently free of constrictions and sufficiently steeply inclined to enable return of the absorption medium with finely divided solids therein without local accumulation of such solids in said air-lift device, whereby said absorption medium may be returned to said absorption chamber without clogging of the air-lift device by accumulation of solids therein.

3. Apparatus for use in the absorption treatment of a gas containing sulphur dioxide with a liquid absorption medium to absorb sulphur dioxide, comprising an absorption chamber, a stripping chamber disposed at an elevation lower than the elevation of the absorption chamber, means for introducing a liquid absorption medium into the absorption chamber, means for contacting the gas to be treated by absorption with liquid absorption medium within the absorption chamber, conduit means connecting the interior of the absorption chamber with the interior of the stripping chamber permitting the flow of absorption medium from the absorption chamber to the stripping chamber by gravity, means for stripping or liberating absorbed sulphur dioxide from absorption medium within the stripping chamber, means for collecting sulphur dioxide liberated in the stripping chamber, means including an air-lift device for returning absorption medium after liberation of absorbed sulphur dioxide from the stripping chamber to the absorption chamber, and means for utilizing a portion of the gas to be treated for operating the air-lift device.

4. Apparatus for use in the absorption treatment of a gas containing sulphur dioxide with a liquid absorption medium to absorb sulphur dioxide, comprising an absorption chamber, a stripping chamber disposed at an elevation lower than the elevation of the absorption chamber, means for introducing a liquid absorption medium into the absorption chamber, means for contacting the gas to be treated by absorption with liquid absorption medium within the absorption chamber, conduit means connecting the interior of the absorption chamber with the interior of the stripping chamber permitting the flow of absorption medium from the absorption chamber to the stripping chamber by gravity, means including a closed steam conduit within the stripping chamber for heating absorption medium to liberate or strip absorbed sulphur dioxide therefrom, an open steam conduit within the stripping chamber for aiding in heating absorption medium and for providing make-up liquid to compensate for evaporation losses, and means for collecting sulphur dioxide liberated in the stripping chamber.

5. Apparatus for use in the absorption treatment of a gas containing sulphur dioxide with a liquid absorption medium to absorb sulphur dioxide, comprising an absorption chamber, a stripping chamber disposed at an elevation lower than the elevation of the absorption chamber, means for introducing a liquid absorption medium into the absorption chamber, means for contacting the gas to be treated by absorption with liquid absorption medium within the absorption chamber, conduit means connecting the interior of the absorption chamber with the interior of the stripping chamber permitting the flow of absorption medium from the absorption chamber to the stripping chamber by gravity, means including a closed steam conduit within the stripping chamber for heating absorption medium to liberate or strip absorbed sulphur dioxide therefrom, an open steam conduit within the stripping chamber for aiding in heating absorption medium and for providing make-up liquid to compensate for evaporation losses, means for collecting sulphur dioxide liberated in the stripping chamber, means for passing absorption medium after liberation of the absorbed sulphur dioxide in heat exchange relationship with absorption medium flowing from the absorption chamber to the stripping chamber, means for returning absorption medium to the absorption chamber after liberation of the absorbed sulphur dioxide, and means for collecting sulphur dioxide liberated in the stripping chamber.

6. Apparatus for use in the absorption treatment of a gas containing sulphur dioxide with a liquid absorption medium of such character that a finely divided solid becomes precipitated therein during the cycle of absorption and release of sulphur dioxide, comprising an absorption chamber, a stripping chamber disposed at an elevation lower than the elevation of the absorption chamber, means for introducing a liquid absorption medium into the absorption chamber, means for contacting the gas to be treated by absorption with the absorption medium within the absorption chamber, conduit means for conducting pregnant absorption medium from the absorption chamber to the stripping chamber, said conduit means being sufficiently steeply inclined and free of obstructions to enable gravity flow of the absorption medium with finely divided solids dispersed therein without local accumulation of such solids in said conduit, whereby said conduit means may accommodate flow of absorption medium therethrough without clogging due to accumulation of solids, and means including an air-lift device for returning stripped absorption medium from the stripping chamber to the absorption chamber, said air-lift device being sufficiently free of constrictions and sufficiently steeply inclined to enable return of the absorption medium with finely divided solids therein without local accumulation of such solids in said air-lift device, whereby said absorption medium may be returned to said absorption chamber without clogging of the air-lift device by accumulation of solids therein.

7. Apparatus for use in the absorption treatment of a gas containing sulphur dioxide with a liquid absorption medium to absorb sulphur dioxide, comprising an absorption chamber, a stripping chamber disposed at an elevation lower than the elevation of the absorption chamber, means for introducing a liquid absorption medium into the absorption chamber, means for contacting the gas to be treated by absorption with the absorption medium within the absorption chamber, means for conducting pregnant absorption medium from the absorption chamber to the stripping chamber, means including an air-lift device for returning stripped absorption medium from the stripping chamber to the absorption chamber, and means for utilizing a portion of the gas to be treated for operating the air-lift device.

8. Apparatus for use in the absorption treatment of a gas comprising an absorption chamber, a stripping chamber disposed below the absorption chamber, an outer substantially vertical conduit connecting the stripping chamber and the absorption chamber, an inner substantially vertical conduit mounted within the outer conduit, the walls of said conduits being spaced apart to provide a substantially vertical annular passage communicating with the interiors of the absorption and stripping chambers, and an air-lift device extending through the interior of said inner conduit from a point adjacent the stripping chamber to a point in the upper portion of the absorption chamber.

9. Apparatus for use in the absorption treatment of a gas comprising an absorption chamber, a stripping chamber disposed below the absorption chamber, an outer substantially vertical conduit connecting the stripping chamber and the absorption chamber, an inner substantially vertical conduit mounted within the outer conduit, the walls of said conduits being spaced apart to provide a substantially vertical annular passage providing for communication between the interior of the absorption chamber and the interior of the stripping chamber, and an air-lift device extending through the interior of said inner conduit and comprising an air-lift riser extending from a point within said inner conduit to a point in the upper portion of the absorption chamber, and means having a liquid inlet adjacent the upper portion of said inner conduit for admitting liquid to said air-lift riser.

RAYMOND F. BACON.